United States Patent

[11] 3,581,490

| [72] | Inventor | Charles W. Morris<br>11769 Chenault Street, Los Angeles, Calif. 90049 |
|---|---|---|
| [21] | Appl. No. | 724,168 |
| [22] | Filed | Apr. 25, 1968 |
| [45] | Patented | June 1, 1971 |

[54] INTERNAL COMBUSTION ENGINE EXHAUST GAS TREATMENT APPARATUS AND METHOD
11 Claims, 8 Drawing Figs.

[52] U.S. Cl. .................................................. 60/30,
23/277, 23/288
[51] Int. Cl. .................................................. F01n 3/14
[50] Field of Search .......................................... 60/29, 30;
23/2.2, 277 C, 288.3 F

[56] References Cited
UNITED STATES PATENTS

| 3,037,344 | 6/1962 | Morris | 60/30 |
| 3,086,839 | 4/1963 | Bloch | 60/30 |
| 3,097,074 | 7/1963 | Johnson | 60/29 |
| 3,203,168 | 8/1965 | Thomas | 60/30 |
| 3,228,185 | 1/1966 | Bergstrom | 60/30 |
| 3,287,898 | 11/1966 | Morris | 60/30 |
| 3,306,035 | 2/1967 | Morrell | 60/30 |
| 3,360,927 | 2/1968 | Cornelius | 60/30 |

*Primary Examiner*—Douglas Hart
*Attorney*—Miketta, Glenny, Poms and Smith

ABSTRACT: An exhaust gas treatment apparatus and method for use with an internal combustion engine including interrelated systems for removing the various contaminants in the exhaust gases which would otherwise pollute the atmosphere. The apparatus includes a nitrogen oxides reduction system having a catalyst for facilitating reduction of nitrogen oxides by carbon monoxide while preventing catalyst deactivation. The apparatus also includes an oxidizing system having provision for adding air and fuel to the oxidizing zone thereof in response to preselected conditions and also including several safety features as required for widespread adoption of the system in automobiles.

PATENTED JUN 1 1971
3,581,490
SHEET 1 OF 3
FIG. 1.
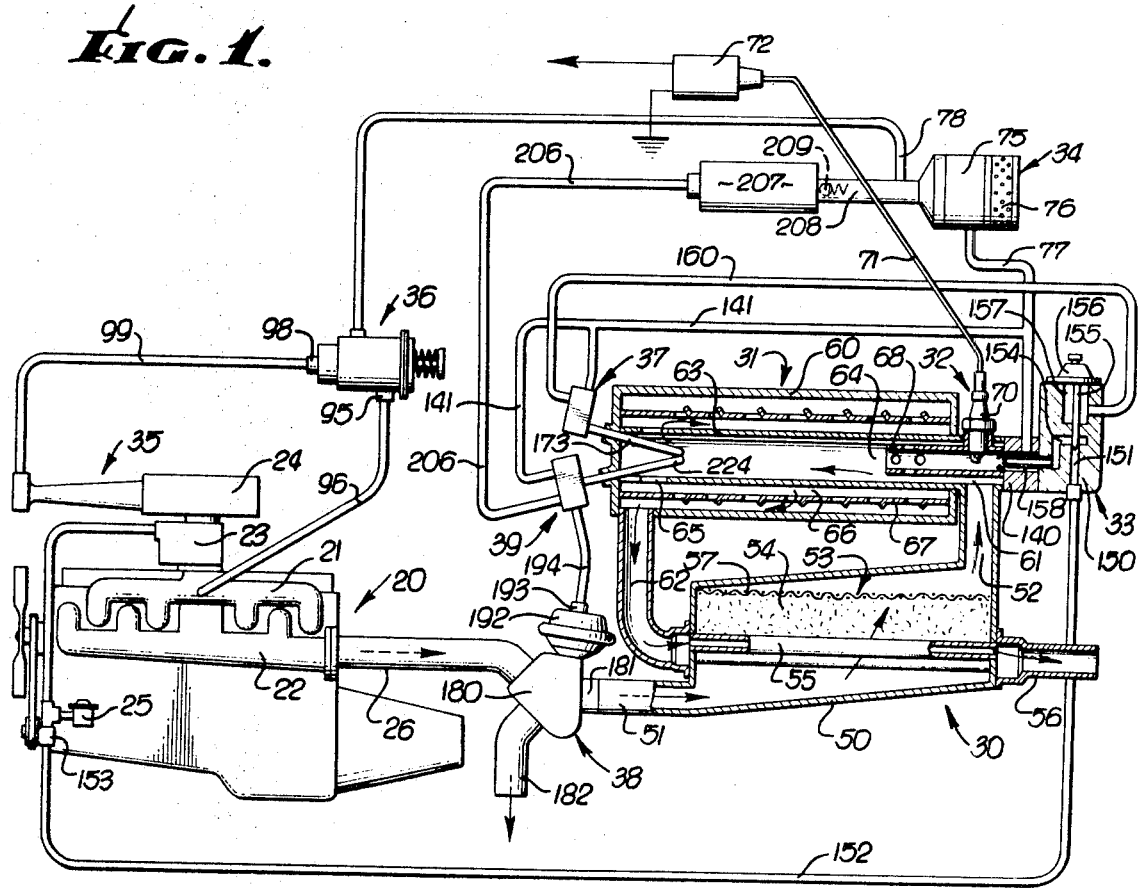
FIG. 3.
FIG. 2.
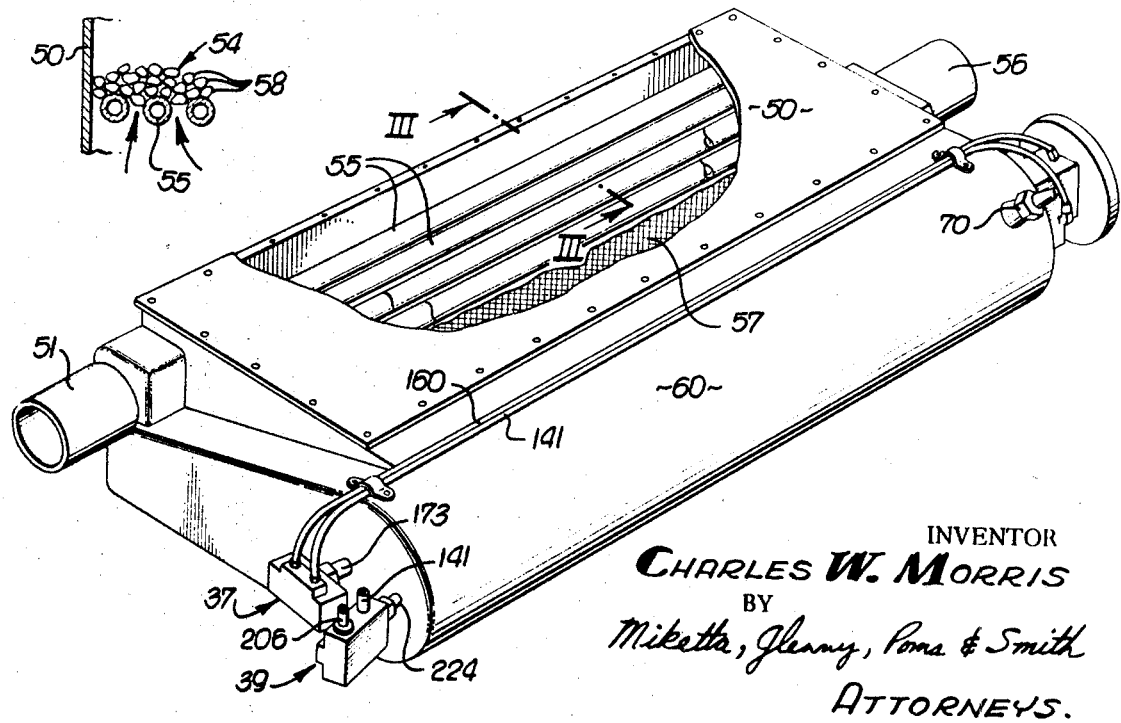
INVENTOR
CHARLES W. MORRIS
BY
Miketta, Glenny, Poms & Smith
ATTORNEYS.

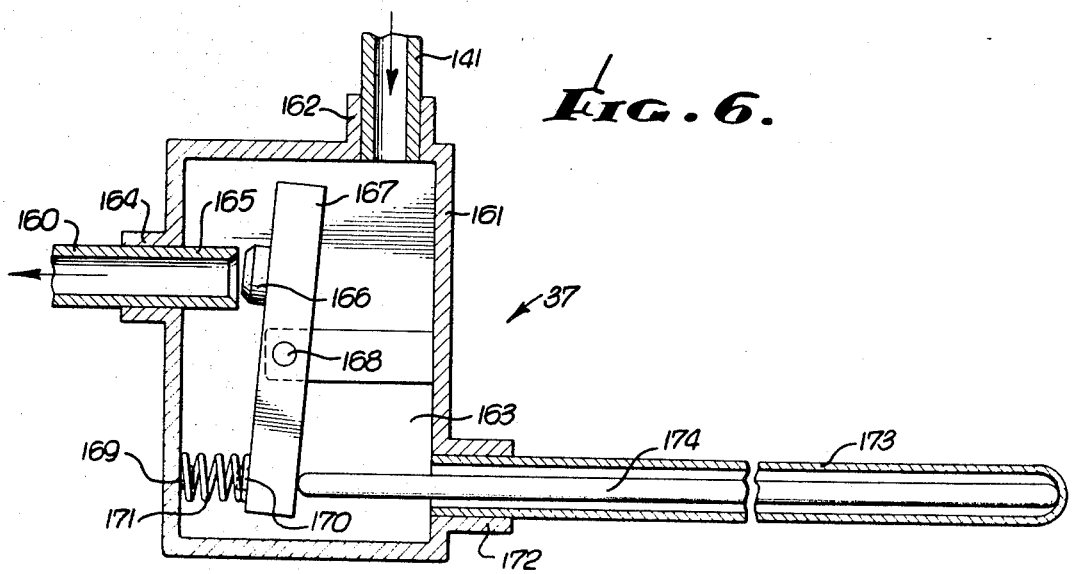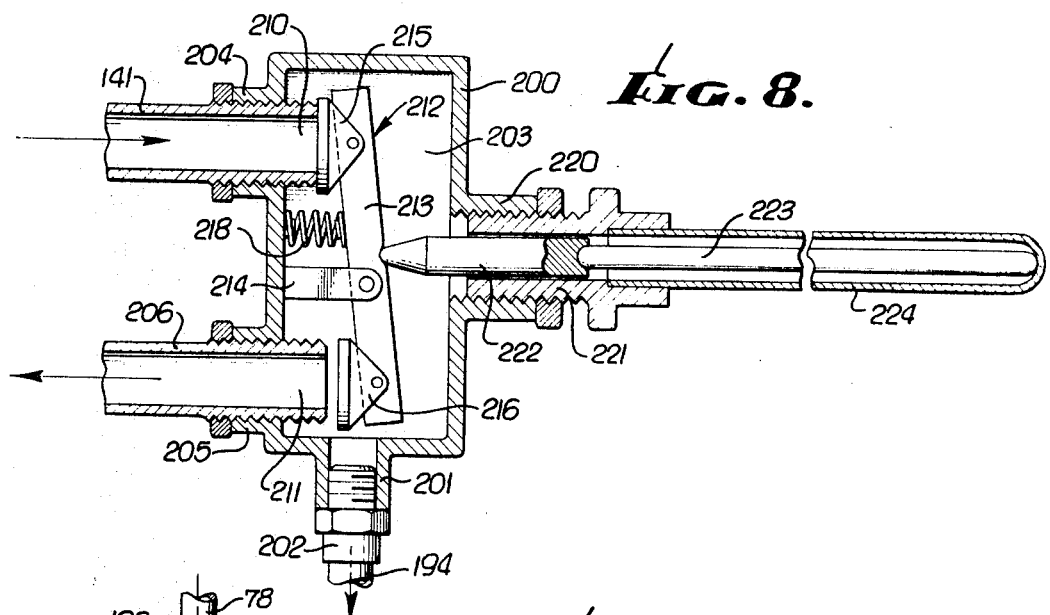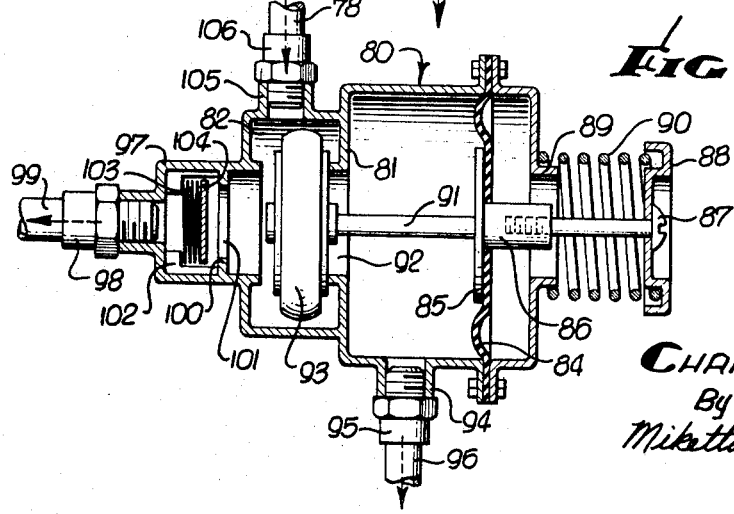

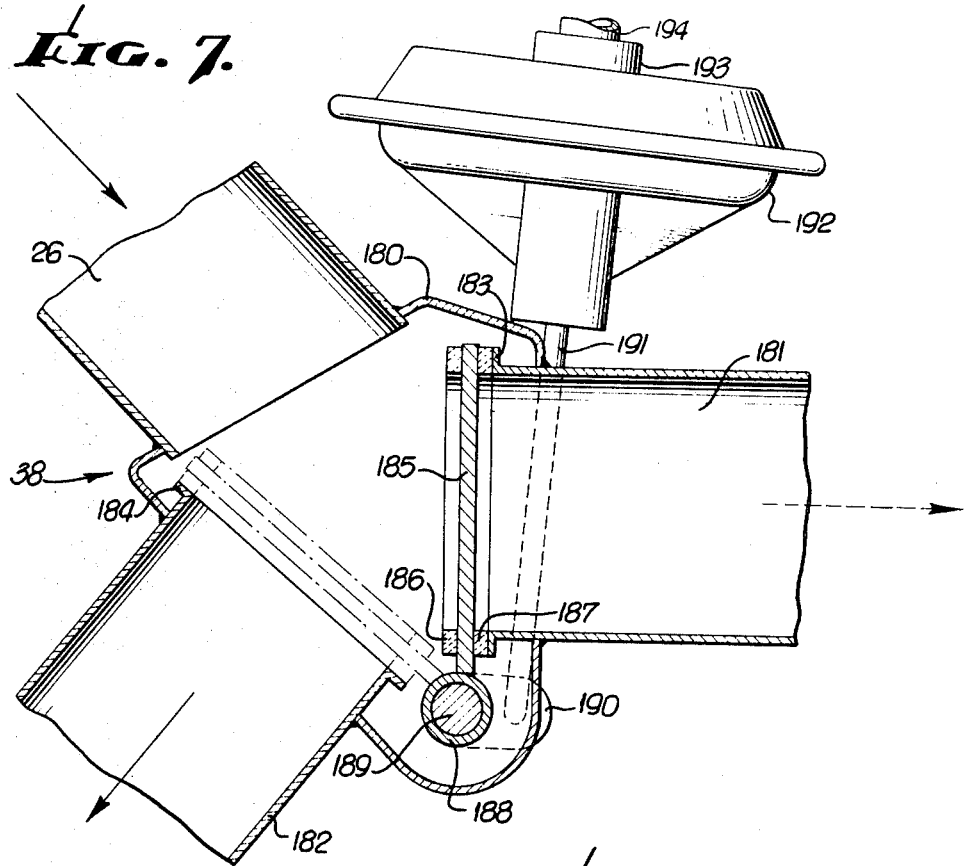
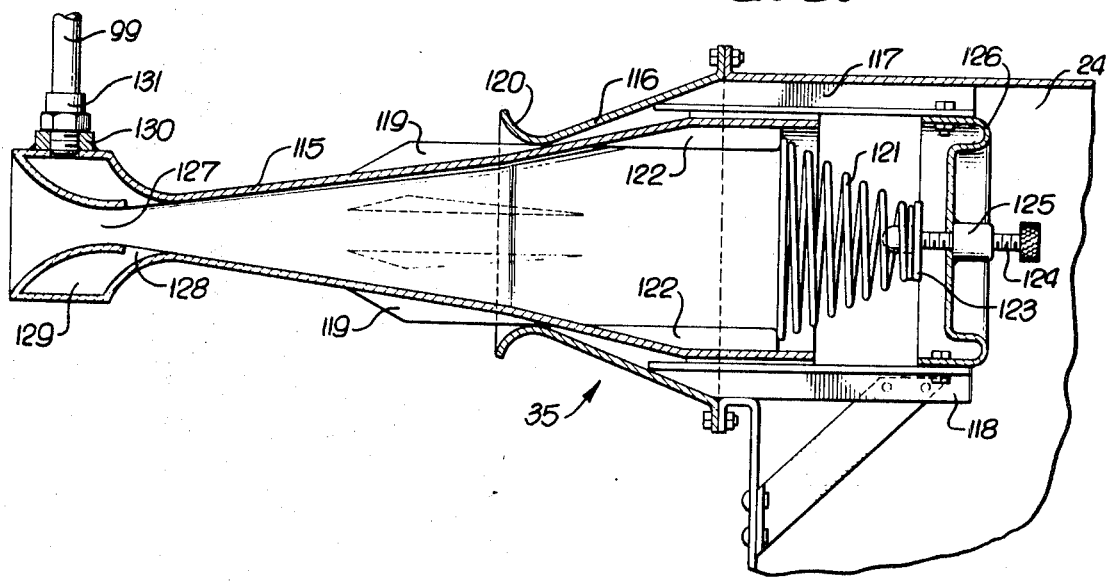

INTERNAL COMBUSTION ENGINE EXHAUST GAS TREATMENT APPARATUS AND METHOD

BACKGROUND OF THE INVENTION

It has long been recognized that a major source of atmospheric pollution has been the emission of exhaust gases containing various toxic, deleterious and objectionable compounds which are discharged from internal combustion engines used in automobiles in great volume. The increasing numbers as well as use of automobiles has created considerable public concern over air pollution problems. Various governmental bodies, particularly in geographic areas of large urban population, have increasingly directed their attention to solution of the automobile exhaust gas pollution problem. While such governmental concern was initially manifested in various state regulations, the problem has increased to the proportion that national governmental regulations have been created.

One aspect of the problem has been the emission of hydrocarbon pollutants from the crankcase, fuel tank and carburetors of automobiles. However, the larger problem exists in the emission of exhaust gases which primarily comprise three major pollutants: nitrogen oxides, carbon monoxide and hydrocarbons. While some progress has been made in the elimination or treatment of exhaust gas emission of hydrocarbons and carbon monoxide, through various prior art devices, there has actually occurred retrogression in the control or conversion of nitrogen oxides in the exhaust gas.

SUMMARY OF THE INVENTION

The present invention is directed to an exhaust gas treatment apparatus and method for use with internal combustion engines and more specifically for use with such engines used to drive automobiles. It is a primary object of the present invention to provide an exhaust gas treatment apparatus and method which effectively and substantially reduces, converts or eliminates all of the contaminants in internal combustion engine exhaust gas which contribute seriously to atmospheric pollution.

It is one object of the present invention to provide an exhaust gas treatment apparatus and method which provides for the effective reduction of nitrogen oxides existing in the exhaust gases which include carbon monoxide from an internal combustion engine by reducing the nitrogen oxides, in the presence of a copper containing catalyst maintained at high temperature, prior to oxidation of the carbon monoxide.

It is another object of the present invention to provide an apparatus of the above-described type which eliminates problems of maintaining and servicing the catalyst due to deactivation of such catalyst caused by the deposition of lead (contained in the exhaust gas) thereon, which would otherwise require the frequent replacement or reactivation of the catalyst thereby rendering such nitrogen oxides reduction system impractical for widespread adoption.

Still another object of the present invention is to provide an exhaust gas treatment apparatus and method which also provides for the substantial reduction of carbon monoxide and hydrocarbons contained in the exhaust gases by flame oxidation of these contaminants.

Yet another object of the present invention is to provide an exhaust gas treatment apparatus and method in which the oxidation occurs through the ignition, addition of air and subsequent combustion of the air, and the carbon monoxide and hydrocarbons contained in the exhaust gas when the temperature of such exhaust gas is sufficient to sustain combustion and which also provides, when the temperature of such gases will not sustain effective combustion, for the addition of fuel to provide the desired oxidation.

One more object of the present invention is to provide an exhaust gas treatment apparatus and method in which the oxidation of the carbon monoxide and hydrocarbons contained in the exhaust gas is due to the increase in temperature of such gas by the heat released from the prior reduction of nitrogen oxides, the heat of oxidation from the burning of air and the hydrocarbons and carbon monoxides themselves, and from the addition of heat due to the injection, if necessary, of fuel when the temperature of the exhaust gas supplied to the oxidizing zone is less than that required to sustain effective oxidation of the hydrocarbon and carbon monoxide alone.

Still one more object of the present invention is to provide an exhaust gas treatment apparatus and method in which the oxidation occurs in the presence of added air and fuel, safety being provided through prevention of fuel flow into the oxidizing zone unless air is being simultaneously added to the oxidizing zone.

One more object of the present invention is to provide an exhaust gas treatment apparatus having a safety provision for preventing the continued flow of extreme high temperature exhaust gases into the exhaust treatment unit (nitrogen oxides reduction and carbon monoxide and hydrocarbon oxidation systems), which temperatures could cause structural failure of such unit by providing for release of the over temperature exhaust gases prior to entry into such unit in response to the temperature of such exhaust gases.

Generally stated, the present invention comprises a method and apparatus for treating exhaust gas from an internal combustion engine and removing the major contaminants in the exhaust gas by reducing the nitrogen oxides in the exhaust gas and by combusting the carbon monoxide and hydrocarbons in the exhaust gas with air using the high temperature oxidized gas to preheat the exhaust gas passing from the engine into the nitrogen oxides reduction zone and providing for the admission of fuel into the oxidizing zone when the temperature of the exhaust gas entering such zone is below a preselected temperature. The addition of fuel to the oxidizing zone is also controlled, for safety purposes, to prevent fuel flow in the absence of air flow to the oxidizing zone. The invention also contemplates the provision of a high temperature safety system including an exhaust gas flow control valve for directing exhaust gas into the exhaust treatment unit or to atmosphere in response to the temperature of the exhaust gas in the oxidizing zone.

The advantages of this invention will be more readily appreciated as the same becomes better understood by reference to the following detailed description when considered in connection with the accompanying drawings.

BRIEF DESCRIPTION OF THE DRAWINGS

FIG. 1 is a schematic drawing of one embodiment of an exhaust gas emission control system constructed in accordance with the present invention;

FIG. 2 is a perspective view, shown in partial section, of a portion of the exhaust gas treatment apparatus;

FIG. 3 is a detailed side sectional view taken along the line III—III of FIG. 2;

FIG. 4 is a detailed side sectional view of a vacuum source selector valve;

FIG. 5 is a detailed side sectional view of auxiliary vacuum producing means for operating a blower providing air to an oxidizing zone;

FIG. 6 is a detailed side sectional view of a temperature and air flow sensitive means for selective operation of fuel control valve means;

FIG. 7 is a side elevation view, in partial section, of an exhaust gas admission control valve means; and FIG. 8 is a detailed side sectional view of a temperature sensitive means for controlling the actuation of a high temperature safety valve.

DESCRIPTION OF THE PREFERRED EMBODIMENT

Referring now to FIGS. 1 through 3, there is shown an exhaust gas treatment apparatus in operative connection with an internal combustion engine 20 such as may be used in an automobile. Engine 20 includes an intake manifold 21, an exhaust manifold 22, a carburetor 23 having an air filter 24 mounted thereon, and a fuel pump 25 connected to the carburetor.

The exhaust gas treatment apparatus generally comprises means for reducing nitrogen oxides in the exhaust gas, indicated generally at 30; an exhaust gas oxidizing means, indicated generally at 31, including ignition means 32, fuel flow valve means 33 and air supply means 34. The air supply means 34 is operated by vacuum produced in intake manifold 21 of internal combustion engine 20 or in auxiliary vacuum producing means or source 35, the vacuum source being selected by vacuum source selector valve means 36. The oxidizing means 31 also includes temperature and air flow sensitive control means 37 for the fuel flow valve means 33. The system also includes high temperature exhaust gas safety means which includes valve means 38 and temperature sensitive valve control means 39.

Nitrogen oxides reduction means is provided for converting the nitrogen oxides in the exhaust gas prior to any addition of air to the exhaust gas. In the exemplary embodiment, the nitrogen oxides reduction means may comprise a housing 50, inlet means 51 in the lower portion of the housing, outlet means 52 in the upper portion of the housing, the inlet means 51 being in fluid communication with the engine exhaust manifold 22. Housing 51 includes a reduction zone, indicated at 53, in which the nitrogen oxides are reduced by the carbon monoxide and in which is disposed a catalyst 54. The exhaust gas, prior to passing into reduction zone 53, and the catalyst, are preheated by means illustrated in the present embodiment as a plurality of heat exchanger tubes 55 supported by the housing 50 intermediate the inlet and outlet means 51, 52, respectively. In this embodiment, the heat exchanger tubes 55 also serve as the support for the catalyst 54 (see FIG. 3) and the gases passing through the tubes are discharged through pipe 56 to the atmosphere. A screen 57, or the like, rests upon the catalyst 54 to maintain the catalytic pellets or tablets 58 in position.

The catalysts useful in the present invention for the reduction of oxides of nitrogen (e.g., nitric oxide and nitrogen dioxide) are known in the art. Any of the metal oxides such as nickel oxides, chromium oxides, copper oxides and the like which are known to be useful in reduction reactions can be utilized in the present invention. However, generally speaking, it is preferred to utilize copper oxide catalysts. Examples of such copper oxide catalysts are cupric oxide (CuO) which may be combined with chromic oxide ($Cr_2O_3$), cobaltic oxide ($Co_2O_3$), and/or alumina ($Al_2O_3$). A particularly preferred catalyst of this invention and one which is utilized in the presently preferred embodiment is Harshaw Cu0203 which is a commercially available catalyst containing 82 percent cupric oxide and 17 percent chromic oxide.

The catalysts may be utilized with or without so-called supports which may be silica, alumina and the like.

Inasmuch as carbon monoxide, in the presence of the above-named copper catalysts, reacts preferentially with oxygen to form carbon dioxide it is important that the carbon monoxide be present in stoichiometric excess with respect to the nitric oxide. Thus, this reaction should be conducted with no substantial amount of oxygen present.

Inasmuch as most gasolines contain a certain amount of lead such as tetraethyl leads or other commercial additives, there is a possibility that the reduction catalyst will be poisoned by the lead. This catalytic poisoning can be prevented by occasionally raising the temperature of the catalyst to about 1,500° F. and preferably between 1,600° and 1,800° F. These high temperatures are obtained when the fluid passing through the heat exchanger tubes 55 is elevated to temperatures above the purging temperatures mentioned. When the internal combustion engine is decelerated the exhaust gas carries a greater percentage of hydrocarbons. Combustion of this hydrocarbon rich exhaust gas in oxidizing means 31 creates the high temperature fluid for the heat exchanger.

Through the occasional admission of exhaust gas into the reduction zone 53 at temperatures about 1,500° F., the catalytic pellets are purged since the catalyst temperature will exceed the temperature of vaporization of the tetraethyl lead used in the gasoline so that the poisonous lead compounds will be carried away in the exhaust gas.

Oxidizing means for oxidation of the exhaust gas after the nitrogen oxides have been reduced is also provided in the exhaust gas treatment apparatus. Oxidizing means in the exemplary embodiment may comprise a housing 60, having an inlet means 61 in fluid communication with the outlet means 52 of reduction housing 50, and an outlet means 62 connected to the heat exchanger tubes 55 within the nitrogen oxides reduction means 30. Supported within housing 60 is a combustor section 63 defining an oxidation or combustion zone 64. Combustor section 63 has an outlet opening 65 to a discharge zone 66 in which is disposed a plurality of baffles 67 for muffling the combustion explosions. A combustor pipe 68 is partially disposed within inlet means 61 and extends into combustor section 63.

Oxidizing means 31 also includes ignition means 32 for providing the spark required for combustion or flame oxidation. Ignition means 32 includes a spark plug 70 the electrode of which extends into the combustor pipe 68 and which is electrically connected through wire 71 to coil 72 of the automotive ignition system. Thus, spark plug 70 is provided with electrical current to create a spark concurrent with the spark provided to the cylinder spark plugs in the internal combustion engine 20.

In the event that the exhaust gas entering the oxidizing means housing 60 is above temperature of 1,400 to 1,450° F., air is admitted into the injector tube 68 and the admixture of air and exhaust gas is ignited within combustion zone 64 so as to substantially reduce the amount of carbon monoxide and hydrocarbons in the exhaust gas. However, if the exhaust gas introduced into the oxidizing means is below 1,400° F., both fuel (preferably the same type and source as supplied to the engine) and air are injected into the tube 68 and the admixture of the fuel and air is ignited by the spark plug 70. These products of combustion mix with the exhaust gas as it passes through the oxidizing zone 64 and heats the exhaust gas while the additional oxygen in the air is mixed with and oxidizes the unburned hydrocarbons and carbon monoxide contained in the exhaust gas. The heated exhaust gas passing from the oxidizing housing through the outlet means 62 flows to the heat exchanger tubes 55, as previously explained, and this high temperature fluid maintains the catalyst bed at temperatures, normally, above 1,000° F. where the performance of the catalytic pellets are at high efficiency so as to convert more than 90 percent of the nitrogen oxides. Moreover, when the internal combustion engine is started in cold ambient atmosphere the exhaust gas introduced into the oxidizing means 31 will normally require the above-described addition of fuel and air which are combusted within the oxidizing zone thus producing a high temperature fluid to the heat exchanger tubes 55 and thereby bringing the entire system up to optimal operating temperature conditions with minimum time delay.

It will therefore be seen from the above description, that the temperature of the exhaust gas has risen through two and possibly three additions of heat. First, there is the release of heat due to the reduction of nitrogen oxides within the nitrogen oxides reduction means 30. Second, there is the heat of oxidation due to the burning of the hydrocarbons and carbon monoxide in the oxidizing zone 64. F Finally, in the event that the exhaust gas introduced into the oxidizing means 31 is below the preselected temperature, there is an additional heating due to the combustion of added fuel and air to the oxidizing zone.

The exhaust gas treatment apparatus also includes air supply means for providing air to the oxidizing means. In the exemplary embodiment, such air supply means may comprise a small turbine-compressor 75. This is the preferred apparatus and method for providing air under pressure to the oxidizing means 31; although it will be understood, that air may be supplied from a belt driven compressor mounted on and driven by the internal combustion engine 20. The turbine-compressor 75 is described in detail in my U.S. Pat. No. 3,287,898. It will suffice for description of the present invention to note that turbine-compressor 75 includes an air inlet means 76, a compressed air outlet conduit 77, and includes a turbine driven by vacuum supplied through a turbine outlet conduit 78.

The turbine outlet conduit 78 is connected to a vacuum source selector valve 36, shown in detail in FIG. 4. Referring to this FIG., it will be seen that vacuum source selector valve 36 may comprise a housing 80 having a partition wall 81 so as to define a first chamber 82 and a second chamber 83. A diaphragm 84 is sealingly fixedly mounted so as to define an outer wall of chamber 83. A plate 85 is carried by diaphragm 84 and includes a threaded boss 86 receiving a cap screw 87 which carries a spring retainer 88. Housing 80 is provided on one end with a spring centering boss 89 which supports one end of compression spring 90 the other end of which is restrained by spring retainer 88.

Extending from the other side of plate 85 is a shaft 91 disposed within chamber 83 and extending through an opening 92 in partition wall 81. The free end of shaft 91 supports a valve closure member 93 within first chamber 82 for selectively opening and closing the opening 92 in partition wall 81. Housing 80 is also provided with an inlet 94 into second chamber 83 for receiving a threaded bushing 95 mounted on a vacuum line 96 the other end of which is in fluid communication with intake manifold 21 (See FIG. 1).

The other end of housing 80 of vacuum source selector valve 36 is also provided with an outlet 97 for receiving a threaded bushing 98 mounted on a vacuum line 99 the other end of which is connected to auxiliary vacuum producing means 35 (See FIG. 1). Within outlet 97 there is provided a second partition wall 100 having an opening 101 so as to define a small chamber 102 in which is disposed a compression spring 103 normally urging a closure member 104 to close the opening 101 in second partition wall 100. Housing 80 also supports a third inlet 105 receiving a threaded bushing 106 mounted on turbine outlet conduit 78 so that such conduit is in fluid communication with first chamber 82 in housing 80.

The operation of the vacuum source selector valve 36 may now be described. When internal combustion engine 20 is operating, a vacuum is created in intake manifold 21 which is communicated through vacuum line 96 to second chamber 83 so as to create a pressure differential across diaphragm 84 overcoming the bias of compression spring 90 and thereby moving shaft 91 so that closure member 93 will uncover the opening 92 in partition wall 81. The intake manifold vacuum is therefore communicated directly to turbine outlet conduit 78 thereby providing the vacuum source for driving turbine-compressor 75. The vacuum within second chamber 83 will deflect diaphragm 84 so as to cause closure member 93 to move sufficiently so as to close outlet 97. When the intake manifold vacuum is high, or if the vacuum in vacuum source 35 falls, check valve closure member 104 will close opening 101 even if closure member 93 does not move sufficiently to close the opening.

Under certain engine operating conditions, the intake manifold vacuum will not be sufficient to provide the desired vacuum to operate the turbine-compressor 75. Under these conditions, the vacuum in second chamber 83 will fail to produce any deflection of diaphragm 84 so that closure member 93 maintains second chamber 83 sealed by closing opening 92 in partition wall 81. This will allow the vacuum from auxiliary vacuum source 35 to be in fluid communication through outlet 97 and first chamber 82 with turbine outlet conduit 78 so as to provide the necessary vacuum to operate turbine-compressor 75. In practice, the vacuum source selector valve 36 may employ a diaphragm 84 and a compression spring 90 so that when vacuum in the intake manifold 21 falls below approximately five inches of mercury, the spring of the selector will cause the closure member 93 to seal the opening 92 and thereby connect the turbine outlet conduit 78 to the auxiliary vacuum creating means 35.

Vacuum producing means or source 35 is illustrated in FIG. 5 and generally comprises an air horn. The air horn 35 is mounted on the carburetor air cleaner or filter 24. Horn 35 includes a converging-diverging nozzle 115, a supplementary air inlet housing 116 bolted to air filter 24, and a pair of guide rails 117, 118 for slidably supporting converging-diverging nozzle 115 for forward and rearward slidable movement. Converging-diverging nozzle 115 is provided with a plurality of radially spaced fins the rearward edges of which are normally in contact with the mouth 120 of air inlet housing 116 and the nozzle is maintained in this position by means of a compression spring 121 the forward edge of which abuts stop means 122 carried on the inner surface of the rearward portion of nozzle 115. The rearward end of compression spring 121 bears upon a washer 123 mounted on an adjustment screw 124 received in a threaded boss 125 carried by a bracket 126 mounted on guide rails 117, 118.

The forward end of nozzle 115 comprises a venturi section 127 in which there is provided an annular opening 128 in fluid communication with a chamber 129. Chamber 129 has an inlet opening 130 for receiving a bushing 131 mounted on the vacuum line 99 that connects the auxiliary vacuum means 35 with the vacuum source selector valve 36 as previously described.

When the air flow into the air horn 35 exceeds, for example, fifty cubic feet per minute of air, the air pressure on the forward lip of nozzle 115 forces the nozzle to slide rearwardly whereby an annular opening is formed between the mouth 120 of air inlet housing 116 and the outer surface of nozzle 115 which are maintained in alignment by means of the fins 119.

When the automobile internal combustion engine is operated with a wide open throttle, such as when pulling a heavily loaded vehicle up a long steep hill, the intake manifold vacuum may become negligible. Under these circumstances, previously referred to, the vacuum in second chamber 83 of vacuum source selector valve 36 similarly becomes negligible so as to open the valve for vacuum communication between auxiliary vacuum producing means 35 and turbine outlet conduit 78. It will be appreciated of course, that under such wide open throttle operating conditions of the internal combustion engine, the air flow through the air horn 35 will be at a near maximum value and the vacuum in the venturi section 127 of the nozzle 115 will create a vacuum source that is wholly sufficient for proper operation of the turbine-compressor 75.

Returning now to FIG. 1, the compressed air outlet conduit 77 of turbine-compressor 75 is connected to air-fuel mixing chamber housing 140. Compressed air outlet conduit 77 has a branch conduit 141 which is connected to temperature and air flow sensitive control means 37 for fuel flow valve means 33.

From the above description of the components of the air supply and admission system it will be appreciated that through the continuous alternative vacuum source produced by the internal combustion engine during all operating conditions, the turbine-compressor 75 will continuously provide and admit air to the oxidizing means 31. Thus, the exhaust gases entering the oxidation means housing 60 will be continuously admixed with a source of air through compressed air outlet conduit 77 and air-fuel mixing chamber housing 140 through injector tube 68 into the combustion zone 64. This additional air provides the oxidation or burning of the hydrocarbons and carbon monoxide in the exhaust gas in the oxidation means 31.

The exhaust gas treatment apparatus also includes fuel supply and control means for providing fuel to the oxidizing means under conditions hereinafter described. In the exemplary embodiment, the fuel supply and control means may comprise fuel flow valve means 33 mounted on air-fuel mixing chamber housing 140 and in communication with the oxidizing zone 64 of oxidizing means housing 60. Fuel flow valve means 33 comprises a valve housing 150 having a lower fuel passage 151 in fluid communication with a fuel line 152 that is connected to internal combustion engine fuel pump 25. Alternatively, the fuel may be supplied through an electric fuel pump such as that shown and described in U.S. Pat. No. 3,174,433. If the fuel supply is to be furnished from the fuel pump of the internal combustion engine, it has been found desirable to incorporate a hydraulic fuse 153 in the fuel line 152 adjacent the fuel pump 25 so that in the event of a cracked or broken fuel line, the excessive flow will cause the fuse to shut off all fuel flow thereby providing a safety device.

The fuel valve housing is provided with a fuel chamber 154 in fluid connection with the fuel passage 151 and a fuel flow closure member 155 supported by a diaphragm 156 for opening and closing the fuel passage 151 to fuel chamber 154. Connected to fuel chamber 154 is a fuel supply tube 158 projecting into the air-fuel mixing chamber within housing 140 to produce an air-fuel spray directed into injector tube 68 where the air-fuel mixture is ignited by spark plug 70.

Diaphragm 156 is in fluid communication through conduit 160 with temperature and air flow sensitive control means 37. Referring now to FIG. 6, the temperature and air flow sensitive control means 37 comprises a housing 161 having an inlet opening 162 connected to branch conduit 141 which is connected to compressed air outlet conduit 77 of turbine-compressor 75. Housing 161 defines a chamber 163 and also includes an outlet opening 164 connected to the conduit 160 which is in fluid communication with diaphragm 156. The inner end 165 of conduit 160 comprises an orifice which is selectively closed by a valve member 166 carried by a lever 167 which is pivotally connected at an intermediate portion through pivot pin 168 to housing 161. Spring retaining bosses 169, 170 are carried by housing 161 and lever 167, respectively, supporting a compression spring 171 normally urging valve member 166 toward orifice 165 in conduit 160 so that conduit 141 and 160 are normally in fluid communication through chamber 163 of temperature and air flow sensitive control means 37.

Housing 161 also includes a boss 172 for supporting an outer sheath 173 of temperature resisting alloy such as inconel, in which is disposed a quartz rod 174 having a lower coefficient of expansion than the inconel sheath 173. Sheath 173 extends into the combustion zone 64 of oxidizing means 31.

In operation, when the temperature in oxidizing zone 64 is below the preselected temperature, the sheath 173 is differentially contracted with respect to rod 174 so that the end of the rod pivots the lever clockwise to the position illustrated in FIG. 6. Under these conditions, the orifice 165 is opened so that compressed air passes through conduit 141 into chamber 163 of housing 161 and through conduit 160 to chamber 157 of the fuel control valve. When chamber 157 is pressurized, diaphragm 156 will move upwardly so as to move valve closure member 155 upwardly thereby allowing fuel to pass through passage 151 into chamber 154 and subsequently into fuel control needle valve 158. Consequently, when the temperature within the oxidizing zone is b below the preselected temperature, fuel is continuously provided to oxidizing means 31.

Conversely, when the temperature in the oxidizing zone 64 is raised above the preselected temperature, sheath 173 is lengthened in relation to quartz rod 174 thereby allowing spring 171 to pivot lever 167 counterclockwise, as viewed in FIG. 6, so that valve member 166 closes orifice 165 of conduit 160. This prevents the compressed air from passing from conduit 141 into conduit 160 so as to operate the fuel flow valve means 33.

It will therefore be seen that control means 37 provides a temperature sensitive fuel control for fuel flow valve means 33. Moreover, it will also be appreciated that unless there is a source of compressed air from turbine-compressor 75 the opening of control means 37 when the temperature in the oxidizing zone 64 decreases will not actuate diaphragm 156 and no fuel will flow. This provides a safety means so that there can be no fuel flow into the oxidizing means 31 unless compressed air is concurrently admitted, thereby preventing destructive explosion of accumulated fuel in the injector tube 68 of oxidizing means 31.

It has been found that in older automobiles and automobiles in which the internal combustion engines are not properly tuned, there may develop a condition commonly referred to as "missing" of the engine. Such condition generally occurs when spark plugs in the internal combustion engine cylinders fail to fire. Under these conditions, there is a discharge of the unburned cylinder charge, comprising the air and fuel mixture, directly into the exhaust manifold 22. This condition causes an excessive amount of unburned hydrocarbons to be carried by the exhaust gas into the oxidizing zone 64 of oxidizing means 31. When these hydrocarbon rich exhaust gases are ignited within the oxidizing zone, excessive temperatures are produced of a magnitude that may cause structural failure or damage of the metal structure of the oxidizing means 31. The metals preferred for construction of oxidizing means 31 have a degradation temperature which may be as low as 2,000° F. and it has been found that the ignition of the rich exhaust gas in the oxidizing zone may produce temperatures in excess of 2,000° F.

Accordingly, the exhaust gas treatment apparatus also includes safety means for preventing the temperature within the oxidizing zone from reaching a value that would damage the apparatus. In the exemplary embodiment, such safety means includes safety control valve means 39, and valve means 38 illustrated in FIG. 7. Valve 38 includes a housing 180, having an inlet opening connected to the engine exhaust manifold 22, a first outlet means 181 connected to the inlet 51 of nitrogen oxides reduction means 30, and a second outlet means 182 which discharges to atmosphere. First and second outlet means 181, 182 are provided with valve seats 183, 184, respectively.

A valve member 185 having seals 186, 187 on opposite sides thereof is fixedly mounted on a cylinder 188 which is secured on shaft 189 pivotally supported in housing 180. On one end of shaft 189 there is mounted a lever arm 190 having an actuating rod 191 pivotally secured at the other end thereof. Actuating rod 191 is connected to diaphragm means 192 having a vacuum inlet 193 to which is connected a conduit 194 (see FIG. 1). A spring (not shown) is provided for biasing valve member 185 to the position shown in full lines in FIG. 7 when engine 20 is not operating.

Conduit 194 is connected to exemplary safety control valve means 39 illustrated in FIG. 8. Control valve means 39 includes a housing 200 having an outlet means 201 for receiving a bushing 202 mounted on conduit 194. Housing 200 defines a chamber 203 and also includes a first inlet means 204 for receiving branch conduit 141 from compressed air outlet conduit 77 of turbine-compressor 75, and a second inlet means 205 receiving a vacuum conduit 206 connected at the other end to a vacuum storage tank 207 (see FIG. 1) to the turbine inlet conduit 78 through vacuum conduit 208. A check valve 209 is provided in conduit 208 and in combination with vacuum storage tank 207 provides a source of vacuum to valve control means 39 during periods of wide-open throttle even during periods of lower intake manifold vacuum.

The ends of conduit 141 and 206 extend within chamber 203 to define orifices 210, 211, respectively, selectively opened and closed by valve closure actuating mechanism 212. Mechanism 212 includes a lever 213 pivotally mounted at its intermediate portion on an arm 214 secured to housing 200. Each end of lever 213 pivotally supports closure elements 215, 216 for selective opening and closing of orifices 210, 211, respectively. A spring 218 is provided for normally biasing lever 213 clockwise, as viewed in FIG. 8, so as to open orifice 210 and closing orifice 211. In the wall of housing 200 opposite the first and second inlet means 204, 205, there is provided a threaded boss 220 extending externally of housing 200. An externally threaded chambered fitting 221 is received in boss 220 and houses an actuating rod 222 mounted on one end to a quartz rod 223, enclosed within an inconel sheath 224. The other end of rod 222 bears upon lever 213.

In operation, valve control means 39 operates as follows. During ordinary operation of oxidizing means 31, i.e., the exhaust gas temperature is below a preselected temperature which would possibly cause structural damage to oxidizing means housing 60. Under such condition, the length of rod 223 with respect to sheath 224 is such that actuating rod 222 will pivot lever 213 against the bias of spring 218 so that lever 213 is biased counterclockwise (as viewed in FIG. 8) forcing closure element 215 to close orifice 210 and allow orifice 211 to remain open. Under this temperature condition, therefore, the vacuum in conduit 206 is communicated through chamber 203 into conduit 194 so as to force actuating rod 191 of safety valve member 185 counterclockwise, as viewed in FIG. 7, so as to close second outlet means 182 allowing the exhaust gas to enter the exhaust gas treatment unit.

However, when the temperature in the oxidizing zone of oxidizing means 31, into which the sheath 224 and quartz rod 223 extend, exceeds a preselected temperature, rod 223 having a lower coefficient of expansion, fails to move actuating rod 222 so that lever 213 pivots clockwise whereby closure element 215 opens orifice 210 and spring 218 biases closure element 216 against vacuum orifice 211. Opening of pressure orifice 210 into chamber 203 provides fluid communication with conduit 194 so as to actuate diaphragm 192 forcing actuating rod 191 downwardly, thereby rotating shaft 189 so as to pivot valve member 185 to seal first outlet means 181 (connected to nitrogen oxides reduction means inlet 51) and open second outlet means 182 so that the overtemperature exhaust gas may vent to atmosphere. The discharge of exhaust gas through outlet means 182 is not muffled and therefore will be accompanied by audible exhaust rumble that will signal that the internal combustion engine is not functioning properly.

When the internal combustion engine is not operating, safety valve means 38 is preferably provided with a spring so as to position valve member 185 to close first outlet means 181 of the valve, preventing exhaust gas from passing into the exhaust treatment unit. When the engine is started, the vacuum created in the intake manifold is transmitted to the valve control means 39 through the conduit 206 and since the temperature in the oxidizing zone will be below the preselected temperature, the vacuum will be transmitted through chamber 203 through conduit 194 to the diaphragm 192 of safety valve 38 causing valve member 185 to rotate so as to close the second outlet means 182 and direct the exhaust gas into the exhaust treatment unit. It has been found that the preferred temperature at which the valve control means 39 is operated, so as to open the valve 38 to atmosphere, is approximately 1,850° F. Combustion in the oxidizing zone below this temperature, will not cause any damage to the structural housing of the system.

The above-described apparatus is exemplary of one means for carrying out a process for treating internal combustion engine exhaust gas so as to remove contaminants therefrom. The method generally comprises passing exhaust gas including nitrogen oxides, carbon monoxide, hydrocarbons and lead directly from an internal combustion engine into a nitrogen oxides reduction zone, where the nitrogen oxides are reduced by carbon monoxide in the presence of a copper containing catalyst. The exhaust gas is subsequently oxidized by the addition of air and by igniting the exhaust gas when the exhaust gas is above a preselected temperature, and by the addition of fuel when the exhaust gas is below a preselected temperature. These high temperature products of combustion are used to heat the copper containing catalyst prior to reduction of the nitrogen oxides.

It is important to note that the exhaust gas emanating from the internal combustion engine is free of oxygen and the addition of oxygen is specifically prevented since the carbon monoxide in the presence of the copper containing catalyst would otherwise react with oxygen to form carbon dioxide. This latter reaction would therefore reduce the necessary amount of carbon monoxide (in stoichiometric quantities) for the effective reduction of the nitrogen oxides.

From the above-described apparatus and method, it will be seen that all of the foregoing objects of the invention have been carried out. Obviously many modifications and variations of the present invention are possible in light of the above teachings. It is therefore to be understood that within the scope of the appended claims, the invention may be practiced otherwise than as specifically described.

I claim:

1. An exhaust gas treatment apparatus for use with an internal combustion engine discharging exhaust gas containing nitrogen oxides, carbon monoxide, and hydrocarbons comprising:
   means for catalytic reduction of nitrogen oxides in the presence of carbon monoxide in the exhaust gas including inlet means for receiving the exhaust gas and outlet means;
   means for oxidation of the hydrocarbons and carbon monoxide in the exhaust gas including inlet means in fluid communication with the outlet means of said catalytic reduction means, means for admitting air, ignition means, and outlet means; and
   means for heating the catalyst disposed within said catalytic reduction means and in fluid communication with the outlet means of said oxidation means.

2. The exhaust gas treatment apparatus of claim 1 wherein said means for oxidation of the exhaust gas additionally includes means for adding fuel to the admitted air to be combusted.

3. The exhaust gas treatment apparatus of claim 2 wherein said means for oxidation of the exhaust gas additionally includes means for sensing the temperature of the exhaust gas within said means for oxidation of the exhaust gas and for selectively controlling admission of fuel into said oxidation means in response to said temperature.

4. The exhaust gas treatment apparatus of claim 3 wherein said means for oxidation of the exhaust gas additionally includes second means for controlling the admission of fuel flow in response to the admission of air into said oxidation means.

5. The exhaust gas treatment apparatus of claim 3 wherein said means for sensing temperature and controlling fuel flow admits fuel when the exhaust gas temperature within said means for oxidation of the exhaust gas is less than 1,400° F.

6. An exhaust gas treatment apparatus for use with an internal combustion engine discharging exhaust gas containing nitrogen oxides, carbon monoxide, and hydrocarbons, comprising:
   means for oxidation of the hydrocarbons and carbon monoxide in the exhaust gas including a housing having inlet and outlet means, means for admitting air, ignition means;
   said means for admitting air comprising a turbine-compressor, a compressed air conduit interconnecting said compressor and said oxidation means housing, vacuum selector valve means, a vacuum line interconnecting the engine intake manifold and the valve means, an auxiliary vacuum source, a second vacuum line interconnecting said auxiliary vacuum source and said valve means, and a third vacuum line interconnecting said valve means and said turbine, whereby said turbine-compressor is driven by a vacuum from the engine intake manifold or the auxiliary vacuum source as selected by said vacuum selector valve means.

7. An exhaust gas treatment apparatus for use with an internal combustion engine having an intake manifold, a carburetor, and an exhaust manifold, the engine discharging exhaust gas through the exhaust manifold, the exhaust gas including carbon monoxide, nitrogen oxides, and hydrocarbons, comprising:
   nitrogen oxides reduction means, including
     a housing having inlet and outlet means, said inlet means in fluid communication with the engine exhaust manifold, and a reduction zone a plurality of heat exchanger tubes supported in said housing, a catalyst supported by said heat exchanger tubes for facilitating reduction of the nitrogen oxides by the carbon monoxide in the exhaust gas, whereby the exhaust gas and said catalyst are heated by said heat exchanger to a temperature sufficient to sustain effective reduction; and carbon monoxide and hydrocarbon oxidation means, including a housing having inlet and outlet means, said inlet means in fluid communication with the outlet means of said nitrogen oxides reduction means housing, and said outlet means in fluid communication with said heat exchanger tubes for providing hot oxidized gases thereto, the other end of said tubes being open to atmosphere, and an oxidizing zone, ignition means, fuel supply means, valve means for controlling fuel flow into said oxidizing zone, means for supplying and admitting air to said oxidizing zone, first means for controlling said fuel flow valve means in response to the temperature in said oxidizing zone, second means for controlling said fuel flow valve means in response to the admission of air into said oxidizing zone, whereby air and fuel are combusted in said oxidizing zone when said exhaust gas received from said nitrogen oxides reduction means is at a temperature insufficient to sustain effective oxidation of the carbon monoxide and hydrocarbons in the exhaust gas.

8. The exhaust gas treatment apparatus of claim 7 wherein said means for supplying and admitting air to said oxidizing zone comprises:

a turbine-compressor;

a compressed air conduit interconnecting said compressor and said oxidation means housing;

vacuum selector valve means;

a vacuum line interconnecting the engine intake manifold and the valve means;

an auxiliary vacuum source;

a second vacuum line interconnecting said auxiliary vacuum source and said valve means; and a third vacuum line interconnecting said valve means and said turbine.

9. The exhaust gas treatment apparatus of claim 8 wherein said auxiliary vacuum source includes a converging-diverging nozzle supported by the engine carburetor and including a venturi section having an opening in fluid communication with said second vacuum line interconnecting said auxiliary vacuum source and said valve means.

10. The exhaust gas treatment apparatus of claim 7 additionally including safety means for preventing the admission of exhaust gas into said nitrogen oxides reduction means and said carbon monoxide and hydrocarbon oxidation means when the exhaust gas discharge from the engine exceeds a preselected temperature, including:

valve means having an inlet in fluid communication with the engine exhaust manifold, a first outlet in fluid communication with the inlet means of said nitrogen oxides reduction means, and a second outlet open to the atmosphere, control means for said valve means to concurrently open one of said valve means outlets and close the other of said valve means outlets, and means for selective operation of said valve control means in response to the exhaust gas temperature in said oxidizing zone.

11. In an exhaust gas treatment apparatus for use with an internal combustion engine discharging exhaust gas, containing nitrogen oxide, carbon monoxide and hydrocarbons, said apparatus having inlet means for receiving the exhaust gas, means for a catalytic reduction of the nitrogen oxide in the presence of carbon monoxide in the exhaust gas, said catalytic reduction means being located in fluid communication with the inlet means to receive the exhaust gas therefrom, means for oxidation of the carbon monoxide and hydrocarbons in the exhaust gas, said oxidation means being located in fluid communication with and downstream of the catalytic reduction means, to receive the exhaust gas from the catalytic reduction means, and outlet means for discharging the exhaust gas from the apparatus, the improvement comprising:

means for heating the catalyst disposed within said catalytic reduction means and located to receive the gas from the oxidation means and to pass the gas through the catalyst.